United States Patent
Shankar et al.

(10) Patent No.: US 11,765,430 B2
(45) Date of Patent: Sep. 19, 2023

(54) METHODS AND APPARATUS TO CALIBRATE RETURN PATH DATA FOR AUDIENCE MEASUREMENT

(71) Applicant: The Nielsen Company (US), LLC, New York, NY (US)

(72) Inventors: Balachander Shankar, Tampa, FL (US); Jonathan Sullivan, Hurricane, UT (US); Molly Poppie, Arlington Heights, IL (US); John Charles Coughlin, Oldsmar, FL (US); Paul Chimenti, Tampa, FL (US); Rachel Worth Olson, Elk Grove Village, IL (US); Samantha M. Mowrer, San Francisco, CA (US); David J. Kurzynski, South Elgin, IL (US); Remy Spoentgen, Tampa, FL (US); Christine Heiss, Ridgewood, NJ (US); Shuangxing Chen, Redwood City, CA (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 17/099,448

(22) Filed: Nov. 16, 2020

(65) Prior Publication Data

US 2021/0144436 A1 May 13, 2021

Related U.S. Application Data

(63) Continuation of application No. 16/152,115, filed on Oct. 4, 2018, now Pat. No. 10,841,649.

(Continued)

(51) Int. Cl.
*H04N 21/442* (2011.01)
*H04N 21/45* (2011.01)
*H04N 21/2187* (2011.01)

(52) U.S. Cl.
CPC ... *H04N 21/44213* (2013.01); *H04N 21/2187* (2013.01); *H04N 21/4532* (2013.01)

(58) Field of Classification Search
CPC ......... H04N 21/44213; H04N 21/2187; H04N 21/4532
See application file for complete search history.

(56) References Cited

U.S. PATENT DOCUMENTS 5,999,796 A 12/1999 Tresness et al.
6,983,478 B1 1/2006 Grauch et al.
(Continued)

OTHER PUBLICATIONS

United States Patent and Trademark Office, "Non-Final Office Action," issued in connection with U.S. Appl. No. 16/152,115, dated Nov. 29, 2019, 11 pages.

(Continued)

*Primary Examiner* — Chenea Davis
(74) *Attorney, Agent, or Firm* — HANLEY, FLIGHT & ZIMMERMAN, LLC

(57) ABSTRACT

Example apparatus disclosed herein include a return path data classifier to classify a first viewing period associated with segments of return path data received from a set top box into tuning classifications based on the segments of the return path data; calculate a total reported tuning duration for the first viewing period when the first viewing period is classified as live or playback tuning; and compare the total reported tuning duration to a duration threshold to determine whether the segments of return path data associated with the first viewing period are valid. The example apparatus also includes a return path data rectifier to rectify missing tuning data associated with a second viewing period based on (Continued)

tuning data included in the segments of return path data associated with the first viewing period when the segments of the return path data associated with the first viewing period are determined to be valid.

20 Claims, 7 Drawing Sheets

Related U.S. Application Data

(60) Provisional application No. 62/681,489, filed on Jun. 6, 2018.

(56) References Cited

U.S. PATENT DOCUMENTS

| | | | |
|---|---|---|---|
| 7,236,941 B2 | 6/2007 | Conkwright et al. | |
| 7,689,128 B2 | 3/2010 | Williams | |
| 8,179,814 B2 | 5/2012 | Shafer et al. | |
| 8,578,403 B2 | 11/2013 | Berezowski et al. | |
| 8,863,166 B2 | 10/2014 | Harsh et al. | |
| 8,893,165 B2 | 11/2014 | Hadfield et al. | |
| 9,578,361 B2 | 2/2017 | Doe | |
| 2003/0028898 A1 | 2/2003 | Howald | |
| 2005/0267750 A1* | 12/2005 | Steuer | H04H 60/37 704/231 |
| 2006/0075421 A1 | 4/2006 | Roberts et al. | |
| 2008/0250453 A1* | 10/2008 | Smith | G06Q 30/0273 725/39 |
| 2008/0300965 A1* | 12/2008 | Doe | H04H 60/33 705/7.33 |
| 2010/0242061 A1 | 9/2010 | Levitan | |
| 2011/0289524 A1 | 11/2011 | Toner et al. | |
| 2012/0278828 A1 | 11/2012 | Yazdani et al. | |
| 2014/0101686 A1 | 4/2014 | Kitts et al. | |
| 2014/0282759 A1* | 9/2014 | Harvey | H04N 21/4668 725/89 |
| 2015/0271540 A1 | 9/2015 | Melby et al. | |
| 2016/0323616 A1 | 11/2016 | Doe | |

OTHER PUBLICATIONS

United States Patent and Trademark Office, "Final Office Action," issued in connection with U.S. Appl. No. 16/152,115, dated Mar. 13, 2020, 10 pages.

United States Patent and Trademark Office, "Advisory Action," issued in connection with U.S. Appl. No. 16/152,115, dated May 20, 2020, 3 pages.

United States Patent and Trademark Office, "Notice of Allowance" issued in connection with U.S. Appl. No. 16/152,115, dated Jul. 7, 2020, 8 pages.

\* cited by examiner

METHODS AND APPARATUS TO CALIBRATE RETURN PATH DATA FOR AUDIENCE MEASUREMENT

RELATED APPLICATION

This patent arises from a continuation of U.S. patent application Ser. No. 16/152,115, filed Oct. 4, 2018, which claims the benefit of U.S. Provisional Patent Application Ser. No. 62/681,489, filed on Jun. 6, 2018. U.S. patent application Ser. No. 16/152,115 and U.S. Provisional Patent Application Ser. No. 62/681,489 are hereby incorporated by reference in their entireties. Priority to U.S. patent application Ser. No. 16/152,115 and U.S. Provisional Patent Application Ser. No. 62/681,489 is claimed.

FIELD OF THE DISCLOSURE

This disclosure relates generally to audience measurement, and, more particularly, to methods and apparatus to calibrate return path data for audience measurement.

BACKGROUND

Many households access media through set top boxes (STBs) provided by media providers (e.g., cable media providers, satellite media providers, etc.). Some STBs are equipped to report tuning data, which is indicative of the media accessed by the STBs, back to the media providers. Tuning data reported back to media providers via STBs is sometimes referred to as return path data (RPD). RPD tuning data may be used by audience measurement entities to monitor people's exposure to media.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
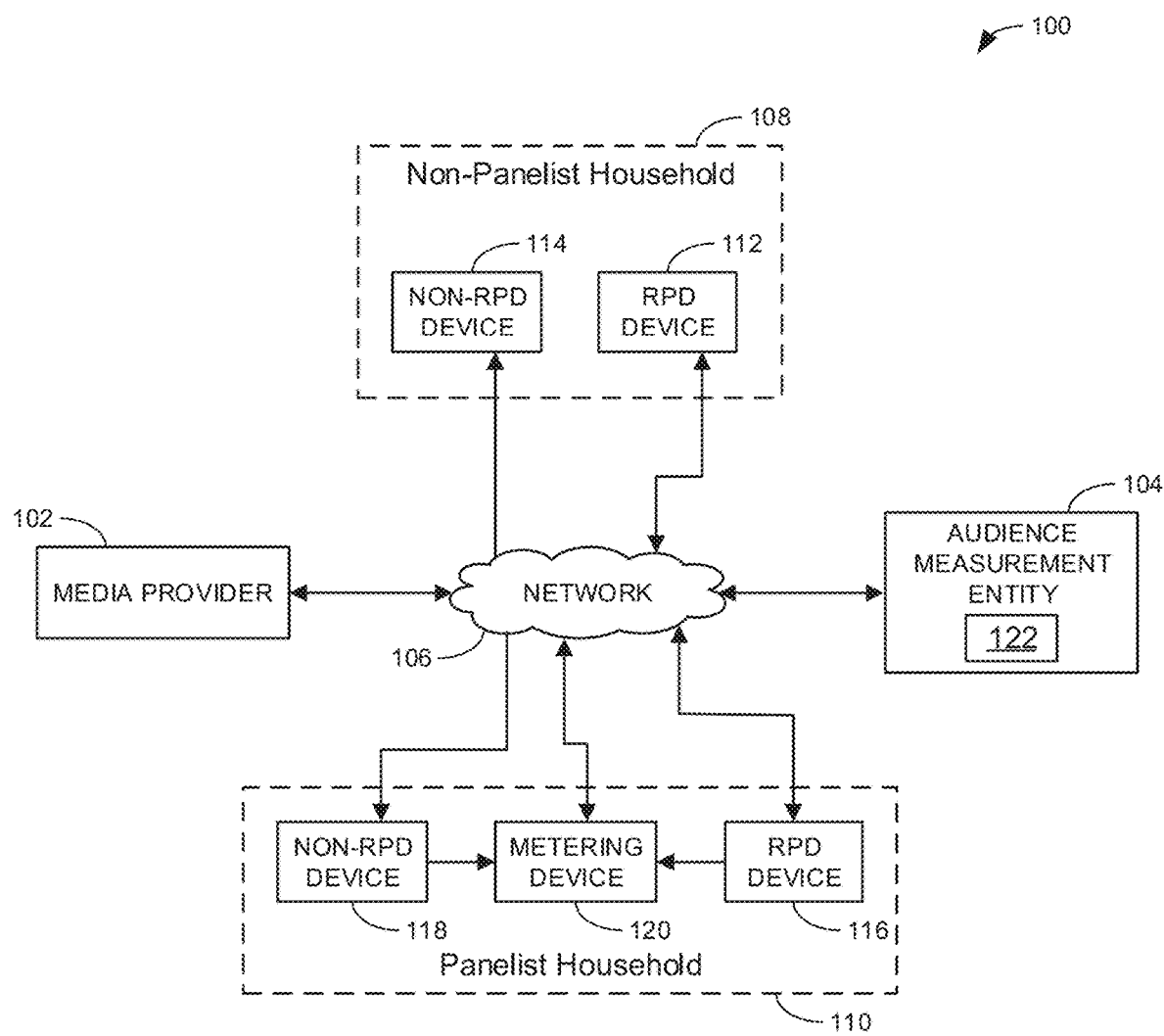
FIG. 1 is an example environment including an example RPD calibration module to calibrate return path data for audience measurement in accordance with teachings disclosed herein.

In the past, audience measurement entities (AMEs) have relied on audience measurement panelists to collect and/or measure audience measurement data used to generate audience metrics such as, for example, media ratings indicative of the number of households tuned to particular media programs at a given point in time. Typically, media ratings, or simply ratings, are expressed as a percentage of households relative to a population of interest, also referred to as a population universe. For example, the population of interest may be an entire country or a more specific geographic region (e.g., a designated market area (DMA) or other local market area). DMAs may range in size from several million households for a large metropolitan area down to a few thousand households in a rural market area.

Typically, national ratings are generated based on audience measurement data collected via people meters installed in statistically selected panelist households. The people meters monitor the exposure of panelists to media and automatically report such data to an AME for subsequent analysis and processing. In addition, some AMEs rely on additional panelists in the smaller local market areas to record their media consumption behavior in paper diaries over specified periods of time and then mail the completed diaries to the AME for subsequent analysis and processing. While paper diaries provide a relatively inexpensive method to increase the audience measurement sample size, what panelists record in the paper diaries may not always be accurate, thereby introducing potential biases in the data. Furthermore, diary samples often favor highly rated broadcast stations while neglecting smaller broadcast or cable networks such that the collected panel data may not be fully representative for reliable analysis.

As technology has advanced, AMEs have turned to tuning data collected, measured, and/or reported from RPD devices as an alternate source of data that may be used to generate ratings for media and/or other audience measurement metrics. As used herein, an RPD device refers to any type of media device (e.g., a STB or other similar device) that is capable of accessing media from a media provider and reporting tuning data regarding the media accessed back to the media provider. Such tuning data is referred to herein as RPD tuning data or simply RPD. Using RPD tuning data for audience metrics has the advantage that it is relatively inexpensive to obtain. For example, RPD tuning data may be obtained substantially automatically based on software installed on processors associated with the RPD devices reporting the RPD tuning data via any suitable network (e.g., the Internet). Not only is RPD tuning data relatively inexpensive to collect based on modern computer technology that makes the reporting of such RPD tuning data possible, RPD tuning data is also advantageous in that it may be collected from much larger quantities of households than possible through traditional audience measurement panels. For example, RPD tuning data may be collected from virtually every household that includes an RPD device because the reporting of RPD tuning data is often set as the default option for such devices at the time of manufacture.

While RPD tuning data provides these advantages, there are challenges with relying exclusively, or even partially, on RPD tuning data for purposes of audience measurement. Even where a household has an RPD device to report tuning data (e.g., the household subscribes to a media content provider), the same household may have other media devices that are not capable of reporting RPD tuning data. Such devices are referred to herein as non-RPD devices. As a result, RPD tuning data collected in such households may not account for media exposure of audience members in non-RPD devices. Therefore, in some examples RPD tuning data reported for a household may not account for all media exposure in the household and, thus, may be biased or illogical. Furthermore, the STBs that produce RPD are often not turned off reliably. As such, when a television is turned off, the STB may still be on and will report RPD during the time the television was turned off. Additionally, when some STBs undergo software updates, they provide RPD that indicates all stations as being active. Thus, while RPD can be collected for a wide array of people, it may be missing tuning data or providing tuning data that was never actually watched.

Example methods, apparatus, and articles of manufacture disclosed herein overcome at least some of the limitations associated with determining media ratings in local markets based on local RPD tuning data by using panel tuning data collected in the surrounding region to the local market to calibrate the RPD tuning data to correct for biases in the RPD tuning data.

Examples disclosed herein calibrate RPD tuning data by classifying viewing periods associated with one or more segments of return path data received from a set top box into one or more tuning classifications (e.g., live tuning, playback tuning, etc.) based on the one or more segments of the return path data. In examples disclosed herein a viewing period can cover multiple segments of tuning data in the return path data. For example, a viewing period may cover one minute and, as such, there may be 1440 viewing periods for a given day, representative of the 1440 total minutes in a day. Alternatively, the viewing period may cover any period of time (partial minutes, multiple minutes, hours, days, weeks, etc.). Segments of tuning data may represent any segment of time (e.g., seconds, minutes, hours, days, etc.) for which RPD tuning data is to be calibrated (e.g., corresponding to the granularity of tuning data to be calibrated).

In some examples disclosed herein, a total reported tuning duration for a viewing period may be calculated when the viewing period is classified as at least one of live or playback tuning. For example, the total reported tuning duration may be calculated by combining tuning segments for a viewing period reported by a STB. In some examples, the segments of tuning data have respective reported tuning durations that contribute to the total reported tuning duration for a viewing period. For example, each segment of a viewing period may have a corresponding reported tuning duration that is combined to contribute to the total reported tuning duration for the viewing period. In some examples, the segments may combine to generate a total reported tuning duration that exceeds the viewing period, which is indicative of error(s) in the RPD. Examples disclosed herein calibrate the RPD tuning data to correct for such errors. Thus, the total reported tuning duration may be compared to a duration threshold (e.g., a value greater than the viewing period) to determine whether segments of return path data associated with a viewing period are valid. In some examples, calibration is also based on a number of tuning sources (e.g., channel numbers, station codes, etc.) tuned by a set top box during a viewing period as determined based on the segments of return path data associated with the viewing period.

In some examples disclosed herein, the segments of return path data associated with the viewing period are identified as valid when the total reported tuning duration satisfies the duration threshold and the number of tuning sources tuned during the viewing period satisfies a tuning source threshold. The tuning source threshold may be determined based on a particular media provider, for example.

Once the RPD tuning data is identified as valid, it may be utilized to rectify missing tuning data associated with a second viewing period. For example, when the segments of the return path data associated with a first viewing period are determined to be valid, the missing return path data associated with the second viewing period may be replaced with the tuning data included in the segments of return path data associated with the first viewing period. For example, segments for a first viewing period may be identified as valid and may be associated with program A. As such, the missing return path data may be rectified to be associated with program A, for example. However, as detailed below, other rules may be applied to rectify and/or calibrate RPD.

FIG. 1 is an example environment 100 including an example media calibration module 122 to calibrate return path data for audience measurement in accordance with the teachings of this disclosure. In the illustrated example, an example media provider 102 provides media to subscribers and collects RPD tuning data indicative of the subscribers accessing the media. The media provider 102 may provide the RPD tuning data to an example audience measurement entity (AME) 104 to enable the AME 104 to generate audience measurement metrics. In some examples, the media provider 102 and the AME 104 communicate via an example network 106 such as, for example, the Internet.

As shown in FIG. 1, the example environment 100 includes an example non-panelist household 108, and an example panelist household 110. The panelist household 110 represents households that have members that have enrolled as panelists with the AME 104, whereas non-panelist household 108 represents households that are not enlisted with the AME 104. There may be any number of panelist households 110 and non-panelist households 108 in the environment 100. In some examples, panelists correspond to a statistically selected subset of all potential audience members that is representative of a population of interest. In some such panel-based monitoring systems, the panelists agree to provide detailed demographic information about themselves. In this manner, detailed exposure metrics are generated based on collected media exposure data and associated user demographics, which can then be statistically extrapolated to an entire population of interest (e.g., a local market, a national market, a demographic segment, etc.).

In the illustrated example, the non-panelist household 108 includes an example RPD device 112 and an example non-RPD device 114. The panelist household 110 differs in that the panelist household 110 includes an example RPD device 116, an example non-RPD device 118, and an example meter 120. However, the non-panelist household 108 can include any number of RPD devices 112 and/or non-RPD devices 114. Likewise, the panelist household 110 can include any number of RPD devices 116 and/or non-RPD devices 118 and/or meters 120. As described above, an RPD device, as used herein, is any type of media device capable of accessing media from a media provider 102 and reporting RPD tuning data back to the media provider. By contrast, a non-RPD device, as used herein, refers to any type of media device that is capable of accessing and/or playing media from a media provider 102 but that does not have the capability to report RPD tuning data back to the media provider 102, or does not have such capabilities enabled.

In the illustrated example of FIG. 1, the non-panelist household 108 and the panelist household 110 include the RPD devices 112, 116 because the households are subscribers to the media provider 102. In some examples, the RPD devices 112, 116 are provided by the media provider 102 when the households initially become subscribers to enable access to media generated by media provider 102. As shown in the illustrated example, the RPD devices 112, 116 may access media from the media provider 102 and report RPD tuning data to the media provider 102 via the network 106.

As shown in the illustrated example, the households 108, 110 may include non-RPD devices 114, 118 in addition to the RPD devices 112, 116. However, a household may have any number of RPD devices and/or non-RPD devices, but does not have to have any RPD devices (i.e., capable of reporting RPD tuning data that is available to the AME 104) or non-RPD devices.

In the illustrated example, the RPD devices 112, 116 may be standalone devices (e.g., STBs, cable modems, embedded multimedia adapters (EMTAs)) that connect to separate media presentation devices, such as, television sets, radios, smartphones, tablets, computers, or any other device capable of playing the media accessed by the RPD devices 112, 116. In some examples, the RPD devices 112, 116 may be integrated with a corresponding media presentation device capable of playing the media accessed by the RPD device (e.g., a smart television). Similarly, the non-RPD devices 114, 118 may be integrated media presentations devices or standalone devices (e.g., STBs) that connect to separate media presentation devices.

As described herein, RPD devices are capable of reporting RPD tuning data to a media provider 102, but non-RPD devices do not. Thus, in the illustrated example, RPD tuning data collected by the media provider 102 would be limited to media accessed via the RPD devices 112, 116. Such data is incomplete as it does not represent the complete exposure to media by all households. For example, the RPD tuning data would not indicate any media exposure by audience members using only non-RPD devices 114, 118. Further, while the RPD tuning data would convey some media to which audience members in the households 108, 110 were exposed, any media accessed via the non-RPD devices 114, 118 is not accounted for in the reported RPD tuning data.

While the RPD tuning data collected from the RPD devices 112, 116 is insufficient to fully account for all media accessed in any of the households, the AME 104 is at least able to fully account for much, and possibly all, of media accessed at the panelist household 110. This is possible because the panelist household 110 is provided with the metering device 120 to track and/or monitor media played in the households 110 and report such to the AME 104 (e.g., via the network 106). In some examples, the metering device 120 also tracks and reports who is being exposed to the media being played so that the media exposure can be associated with particular individuals and their associated demographics previously collected when the household members enrolled as panelists. While a single metering device 120 is shown in the panelist household 110 to monitor both the RPD device 116 and the non-RPD device 118, in some examples, a separate metering device 120 may be associated with each device to independently track and report media accessed by each device to the AME 104.

In the illustrated example of FIG. 1, the AME 104 includes the example RPD calibration module 122 to calibrate RPD tuning data used to complete ratings data as described more fully below. More particularly, the RPD calibration module 122 uses panel tuning data included in audience measurement data collected from panelist households (e.g., from the metering device 120 of the panelist household 110) to calibrate RPD. In some examples, the RPD calibration module 122 determines whether RPD is complete and logical (e.g., validating tuning segments of a viewing period) and rectifies incomplete tuning data. In some examples, the RPD calibration module 122 identifies tuning across viewing periods missing tuning data, with such tuning being identified based on adjacent tuning data as reported in the RPD. For example, RPD received from the RPD device 116 may be missing multiple segments of tuning data for a given viewing period. As such, the RPD calibration module 122 may identify segments of tuning data that occur prior to and subsequent the missing segments, and modify (e.g., bridge the gap) the missing segments based on bridging rules. The bridging rules are discussed in more detail below in connection with FIG. 2. In some examples, the RPD calibration module 122 generates a grid of segments for viewing periods for each STB included in the RPD. For example, the RPD calibration module may receive RPD from each RPD device 112, 116 and generate a grid of segments for each viewing period. In some examples, the RPD calibration module 122 then evaluates the segments to determine if the RPD is valid (e.g., usable) for reporting for a given day. Examples disclosed herein calibrate RPD without the need or expense of employing paper diaries or having a large sample size of panelists specifically located within the local market area.

Figure 2:
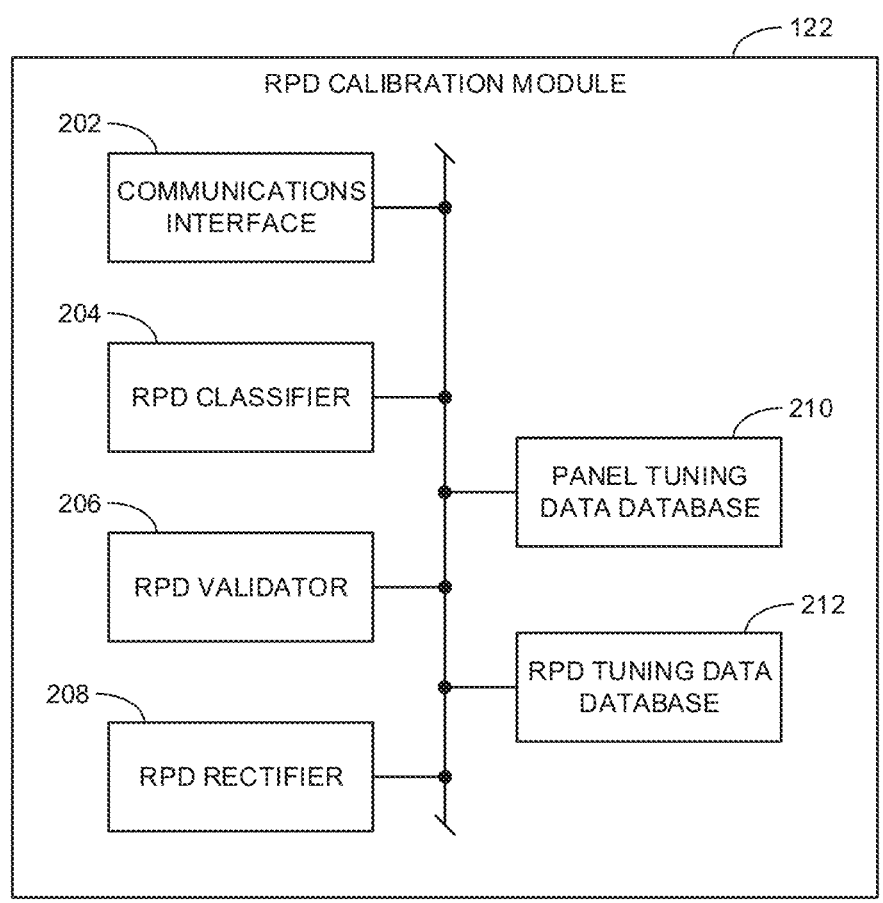
FIG. 2 is an example implementation of the example RPD calibration module of FIG. 1.

FIG. 2 is an example implementation of the example RPD calibration module 122 of FIG. 1. The example RPD calibration module 122 includes an example communications interface 202, an example RPD classifier 204, an example RPD validator 206, an example RPD rectifier 208, an example panel tuning data database 210, and an example RPD tuning data database 212.

The example RPD calibration module 122 is provided with the example communications interface 202 to communicate with the metering device 120 installed in the panelist household 110. That is, the metering device 120 may report audience measurement data to the AME 104 that is received by the communications interface 202. The communications interface 202 may receive audience measurement data from other panelist households not represented in the illustrated example. The collected audience measurement data includes panel tuning data, which may be stored in the panel tuning data database 210. The panel tuning data may include an indication of the media accessed via the associated media devices (e.g., the RPD device 116 or the non-RPD device 118). In the illustrated example, the panel tuning data includes an identifier of the particular media device used to access the media and/or an indication of whether the media device is capable of reporting RPD tuning data (i.e., whether the media device is an RPD device). In some examples, the media accessed by the media devices may be uniquely identified by the panel tuning data. In some examples, the panel tuning data may identify a particular source of media (e.g., a station ID) from which the particular media may be identified based on an associated timestamp included in the panel tuning data.

In the illustrated example, the communications interface 202 of the RPD calibration module 122 receives RPD tuning data from the media provider 102. The media provider 102 collects the RPD tuning data reported from RPD devices (e.g., the RPD devices 112, 116) accessing media provided by the media provider 102. In some examples, the communications interface 202 may receive the RPD tuning data directly from the RPD devices 112, 116 independent of communications between the AME 104 and the media provider 102. The RPD tuning data may be stored in the RPD tuning data database 212. Similar to the panel tuning data, the RPD tuning data includes a media identifier (e.g., a unique identifier, a station ID with an associated timestamp, etc.) to identify the media accessed by the RPD devices.

To classify the RPD tuning data, the RPD classifier 204 receives the RPD tuning data for the non-panelist household 108 and the panelist household 110. In some examples, the RPD classifier 204 receives the RPD tuning data from the communications interface 202. In some examples, the RPD classifier 204 may retrieve the RPD tuning data from the RPD tuning data database 212. Once the RPD tuning data has been received, the RPD classifier 204 classifies each viewing period corresponding to the RPD tuning data. For example, the RPD classifier 204 may receive RPD tuning data indicative of one day of tuning data. As such, the RPD classifier 204 may generate a grid indicative of the 1440 minutes in a day. Each section of the grid represents a viewing period (e.g., a viewing period corresponds to a minute in this example, but viewing periods may have other durations in other examples.). The example RPD classifier 204 classifies each viewing period in the grid. For example, the RPD classifier 204 may classify each viewing period as either live tuning, playback tuning, OFF, stand-by and/or gap tuning. To classify each viewing period, the RPD classifier 204 may classify each segment of RPD of the viewing period based on descriptive data included with the RPD segment, and compare the classification to a threshold. For example, the RPD classifier 204 may identify that 29 segments (e.g., seconds) of the viewing period correspond to live tuning based on descriptive data included with the RPD segments, while the remaining segments correspond to playback tuning based on descriptive data included with the RPD segments. In such an example, the RPD classifier 204 classifies that viewing period as playback tuning based on the majority of the segments corresponding to playback tuning. In some examples, the RPD classifier 204 may classify the viewing period as both live tuning and playback tuning. In some examples, the RPD classifier 204 may classify a viewing period as OFF when the RPD tuning data is indicative of the STB being turned off. The example RPD classifier 204 may classify a viewing period as gap tuning if there is missing or illogical tuning data, or if there is not a sufficient amount of RPD tuning data to classify the viewing period. In some examples, the RPD classifier 204 may utilize heartbeat data (e.g., information indicative of a STB functioning properly) to classify a viewing period. For example, if heartbeat data is expected to be generated for a specific viewing period or for a specific period of time, the RPD classifier 204 may classify that viewing period and/or viewing periods as gap tuning if the heartbeat data is missing. As an example, for a certain type of STB, heartbeat data is expected at or around 12:00 AM, and a majority of STBs of this type are known to generate heartbeat data between 11:45 PM and 12:15 AM. As such, if the RPD classifier 204 identifies heartbeat data for a certain STB at 2:00 AM, the RPD classifier 204 may identify the viewing periods between 12:15 AM and 2:00 AM as gap tuning. In another example, heartbeat data may be expected every eight hours for a given type of STB, with a majority of STBs of that type generating heartbeat data every seven and a half to eight and a half hours. In such an example, the RPD classifier 204 may identify heartbeat data for such STB at 1:00 AM and heartbeat data for the same STB at 10:00 AM. In that example, the RPD classifier 204 may classify the viewing periods between 9:30 AM and 10:00 AM as gap tuning.

Once the RPD classifier 204 has classified the viewing periods of interest, the RPD classifier 204 further classifies the viewing periods that were classified as live tuning and/or playback tuning. For example, for each viewing period that was classified as live tuning and/or playback tuning, the RPD classifier 204 calculates a total reported tuning duration for the given viewing period and compares it to a threshold. For example, the RPD classifier 204 may calculate a total reported tuning duration by accumulating individual reported tuning durations for respective RPD segments included in a viewing period, such as a given minute of a day. The RPD classifier 204 may calculate the total reported tuning duration based on start/end times for the classified viewing period. As an example, based on descriptive data of the RPD, the RPD classifier 204 may identify live tuning to station XYZ from 1:01:05 PM to 1:03:15 PM, playback tuning to station UVW from 1:01:01 PM to 1:15:08 PM, and live tuning to station RST from 1:02:33 PM to 1:45:00 PM. In such an example, the RPD classifier 204 will calculate a total reported tuning duration of 147 seconds for the viewing period representative of 1:02:00 PM (corresponding to 60 seconds for station XYZ, 60 seconds for station UVW, and 27 seconds for station RST). In this example, the viewing period represents a minute, so the threshold may be set at 65 seconds. As such, the RPD classifier 204 may classify the viewing period for 1:02:00 PM as an overlapping minute because the total reported tuning duration of 147 seconds exceeds the threshold of 65 seconds.

For the viewing periods classified as overlapping minutes, the RPD classifier 204 calculates a number of tuning sources (e.g., channel numbers, station codes, etc.) that account for at least a threshold portion of the viewing period. For example, the RPD classifier 204 may classify a viewing period as conflicted tuning if the number of tuning sources that account for at least 31 seconds of the viewing period exceeds a threshold (e.g., 2 tuning sources, 4 tuning sources, etc.). The RPD classifier 204 continues to classify the viewing periods until all of the viewing periods have been classified.

In the foregoing example, reported tuning duration was determined in units of seconds. However, in other examples, the reported tuning duration may be determined in other units, such as in portions/fractions, etc. of the viewing period.

Once the RPD tuning data has been classified, the RPD validator 206 validates the classified RPD tuning data. To validate the RPD tuning data, the RPD validator 206 generates activity validation data based on the RPD tuning data from the panelist household 110. For example, the RPD validator 206 may generate the activity validation data based on the information received from the RPD device 116, the non-RPD device 118, and the meter 118. In some examples, the RPD validator 206 may generate the activity validation data based on the panel tuning data stored in the panel tuning data database 212. To generate the activity validation data, the RPD validator 206 generates a grid corresponding to viewing periods for the reported RPD tuning data. The RPD validator 206 may further include identifiers (device identifiers, media identifiers, etc.) for each of the viewing periods in the grid. In some examples, the RPD validator 206 generates the activity validation data prior to the RPD classifier 204 classifying the RPD tuning data. Once the activity validation data has been generated, the RPD validator 206 processes the classified RPD tuning data from the RPD classifier 204.

In the illustrated example, to validate the classified RDP tuning data, the RPD validator 206 determines if the RPD tuning data is complete. For example, the RPD validator 206 may determine 1) if there is a threshold amount of heartbeat data, 2) whether specific information was collected from the RPD tuning data (e.g., the STB was tuned to a certain station and not off during a time period of interest), and/or 3) when the specific information was collected. In some examples, the RPD validator 206 determines if RPD tuning segment(s) for each viewing period has(have) start and end times that are consistent. For example, when the RPD validator 206 identifies playback tuning (e.g., time-shifted tuning), the RPD validator 206 validates that there are two sets of start and end times, one corresponding to the broadcast duration and the other corresponding to the playback duration. The RPD validator 206 further determines that the playback tuning is valid by determining that the broadcast duration is equal to the playback duration. If the RPD validator 206 identifies any discrepancies based on the RPD information not satisfying the above criteria, the RPD validator 206 may edit the RPD tuning data based on the activity validation data or may remove the RPD tuning data from further processing.

In some examples, to edit the RPD tuning data, the RPD validator 206 identifies any non-residential STBs (e.g., commercial accounts, multiple dwelling units, etc.) and removes the RPD tuning data from further processing. If information is not available to identify non-residential status, the RPD validator 206 identifies accounts that are associated with a large number of STBs, for example 20 or more, and removes the RPD information from further processing. Once the non-residential RPD tuning data has been removed, the RPD validator 206 identifies incomplete RPD tuning data that may need to be validated and/or edited. For example, the RPD validator 206 verifies that each segment(s) of RPD tuning data associated with that viewing period is associated with at least one tuning source. If multiple segments of RPD tuning data associated with viewing periods are not associated with a tuning source, the RPD validator 206 compares the total tuning duration (X) to the total duration of tuning that cannot be mapped (Y). The RPD validator 206 determines if the ratio of X to Y (X/Y) exceeds a certain threshold. If the RPD validator 206 determines that X/Y exceeds the threshold, the RPD tuning data is considered unusable and is removed from further processing.

After the RPD tuning data has been classified and validated, the RPD rectifier 208 identifies tuning sessions (e.g., multiple viewing periods with similar tuning classifications) for the RPD tuning data. The RPD rectifier 208 may identify the tuning sessions by looking for at least one of a change in station or tuning state (e.g. channel change, STB turned off, change from live tuning to playback tuning) in the RPD tuning data, or viewing periods identified as gap tuning. The RPD rectifier 208 then identifies each viewing period in the tuning session and identifies viewing periods that are missing tuning data (e.g., classified as gap tuning).

The RPD rectifier 208 then modifies the RPD tuning segments for the viewing periods with missing tuning data based on bridging rules. In some examples, the bridging rules include: 1) if the RPD tuning segment is at the start of the tuning session, the segment is rectified to match the tuning data of the following segment; 2) if the RPD tuning segment is at the end of the tuning session, the segment is rectified to match the tuning data of the preceding segment; 3) if segments on either side of the RPD tuning segment classified as gap tuning have the same tuning data, the segment classified as gap tuning is rectified to match that tuning data. If segments on either side of the segment classified as gap tuning have different tuning data, the segment classified as gap tuning is assigned tuning data based on one of the following methods: 1) apply a hierarchy whereby, among tuning data on either side of the segment classified as gap tuning, preference is based on: i) live tuning over playback tuning (or vice versa), ii) live tuning or playback tuning over stand-by, etc.; 2) the viewing period of adjacent tuning data is used; or 3) a portion of a segment will be randomly selected. For instances when the portion of the segment is randomly selected, the RPD rectifier 208 rectifies the segment to include the tuning data of the segment prior to the portion of the segment classified as gap tuning up to the portion of the segment. The RPD rectifier 208 rectifies the remaining portion of the segment to include tuning data from the segment following the end of the portion of the segment.

Once the RPD rectifier 208 has rectified the RPD tuning data, the RPD rectifier 208 determines if the RPD tuning data for a household (e.g., non-panelist household 108) is usable (e.g., in-tab) for a given day. For example, the RPD rectifier 208 determines that all active STBs for the household (e.g., non-panelist household 108) have the same zip code and/or headend. The RPD rectifier 208 then determines that the remaining segments classified as gap tuning does not exceed a gap tuning threshold (e.g., 10% or some other value). The RPD rectifier 208 then determines if the segments associated with viewing periods classified as conflicted tuning does not exceed a conflicted tuning threshold (e.g., 3%). Further, the RPD rectifier 208 may determine that the number of segments associated with viewing periods classified as live tuning does not exceed a live tuning threshold (e.g., 300). In some examples, if the RPD tuning data does not include any missing or illogical data (e.g., the RPD rectifier 208 was able to rectify all of the RPD tuning data), then the RPD rectifier 208 may not determine if any segments exceed the gap tuning threshold.

While an example manner of implementing the RPD calibration module 122 of FIG. 1 is illustrated in FIG. 2, one or more of the elements, processes and/or devices illustrated in FIG. 2 may be combined, divided, re-arranged, omitted, eliminated and/or implemented in any other way. Further, the example communications interface 202, the example RPD classifier 204, the example RPD validator 206, the example RPD rectifier 208, and/or, more generally, the example RPD calibration module 122 of FIG. 1 may be implemented by hardware, software, firmware and/or any combination of hardware, software and/or firmware. Thus, for example, any of the example communications interface 202, the example RPD classifier 204, the example RPD validator 206, the example RPD rectifier 208, and/or, more generally, the example RPD calibration module 122 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example communications interface 202, the example RPD classifier 204, the example RPD validator 206, the example RPD rectifier 208, and/or, more generally, the example RPD calibration module 122 is/are hereby expressly defined to include a non-transitory computer readable storage device or storage disk such as a memory, a digital versatile disk (DVD), a compact disk (CD), a Blu-ray disk, etc. including the software and/or firmware. Further still, the example RPD calibration module 122 of FIG. 1 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic or machine readable instructions for implementing the RPD calibration module 122 of FIG. 1 are shown in FIGS. 3-6. The machine readable instructions may be a program or portion of a program for execution by a processor such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowcharts illustrated in FIGS. 3-6, many other methods of implementing the example RPD calibration module 122 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 3-6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

Figure 3:
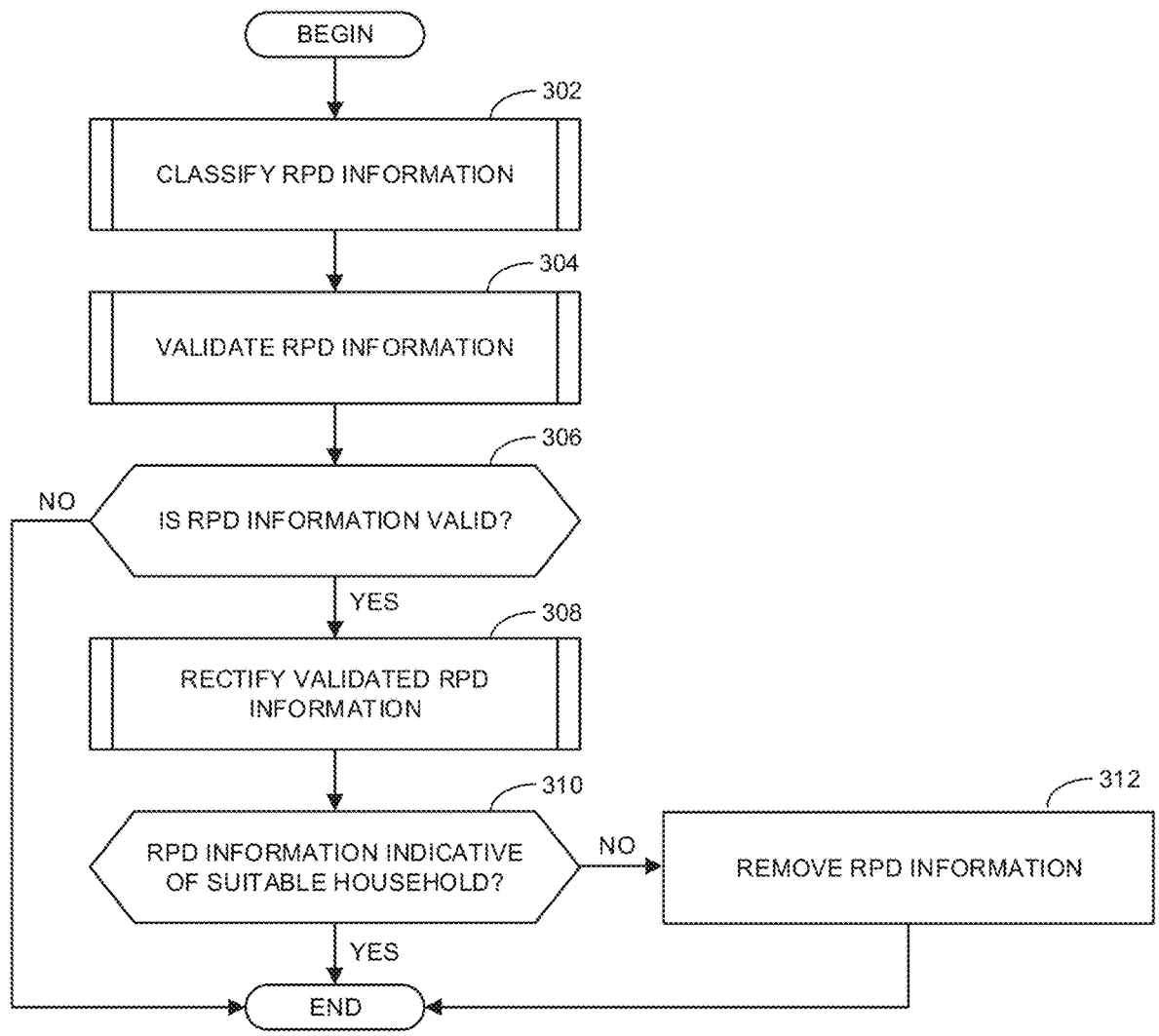
FIGS. 3-6 are flowcharts representative of example machine readable instructions that may be executed to implement the example RPD calibration module of FIGS. 1 and/or 2.

FIG. 3 is a flowchart representative of example machine readable instructions that may be executed to implement the RPD calibration module 122 of FIGS. 1 and/or 2. The program of FIG. 3 begins by classifying RPD information (block 302). For example, the RPD classifier 204 may receive RPD tuning data for the non-panelist household 108 and the panelist household 110. The RPD validator 206 then validates the RPD information (block 304). The RPD validator 204 then determines if the RPD information is valid (block 306). If the RPD information is not valid, the process ends. If the RPD information is valid, the RPD rectifier 208 rectifies the validated RPD information (block 308). The RPD rectifier 208 then determines if the RPD information is indicative of a suitable household (block 310). If the RPD information is not indicative of a suitable household, the RPD rectifier 208 removes the RPD information (block 312). If the RPD information is indicative of a suitable household, the process ends.

Figure 4:
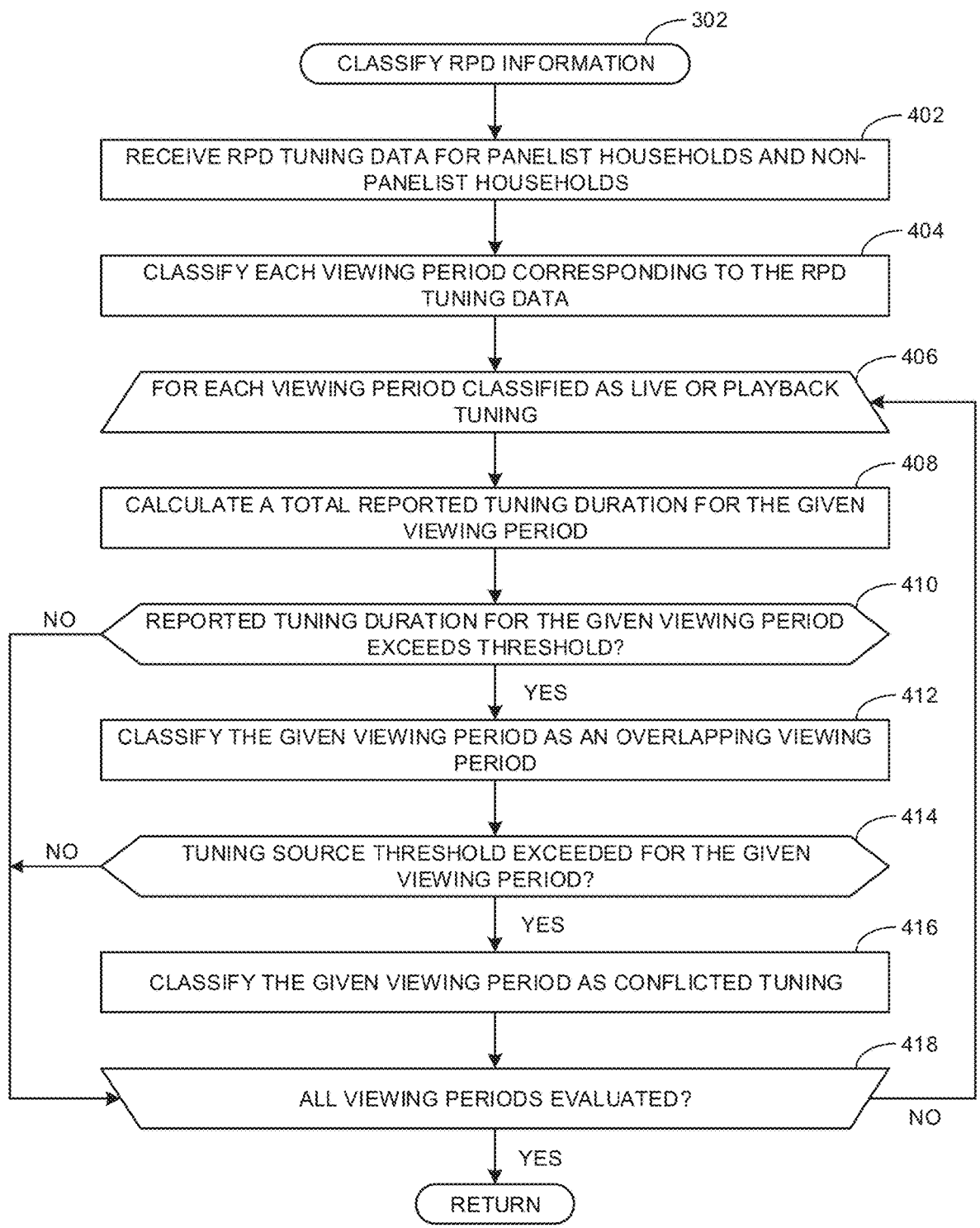

FIG. 4 is a flowchart representative of example machine readable instructions that may be executed to implement the RPD classifier 204 to classify RPD information and/or to perform the processing at block 302 of FIG. 3. The process 302 of FIG. 4 begins when the RPD classifier 204 receives RPD tuning data form panelist households and non-panelist households (block 402). The RPD classifier 204 then classifies each viewing period corresponding to the RPD tuning data (block 404). For each viewing period classified as live or playback tuning (block 406), the RPD classifier 204 calculates a total reported tuning duration for the given viewing period (block 408). The RPD classifier 204 then determines if the reported tuning duration for the given viewing period exceeds a threshold (block 410). If the reported tuning duration does not exceed the threshold, the RPD classifier 204 determines if all viewing periods have been evaluated (block 418). If all viewing periods have been evaluated, the process returns to block 302. If all viewing periods have not been evaluated, the process returns to block 406 to select another viewing period to classify.

However, if the reported tuning duration exceeds the threshold, the RPD classifier 204 classifies the given viewing period as an overlapping viewing period (block 412). The RPD classifier 204 then determines if the tuning source threshold has been exceeded for the given viewing period (block 414). If the tuning source threshold has not been exceeded, the process proceeds to block 418 to determine if all viewing periods have been evaluated. However, if the tuning source threshold has been exceeded, the RPD classifier 204 classifies the given viewing period as conflicted tuning (block 416). The RPD classifier 204 then determines if all viewing periods have been evaluated (block 418). If all viewing periods have been evaluated, the process returns to block 302. If all viewing periods have not been evaluated, the process returns to block 406 to select another viewing period to classify. The process then returns to block 302.

Figure 5:
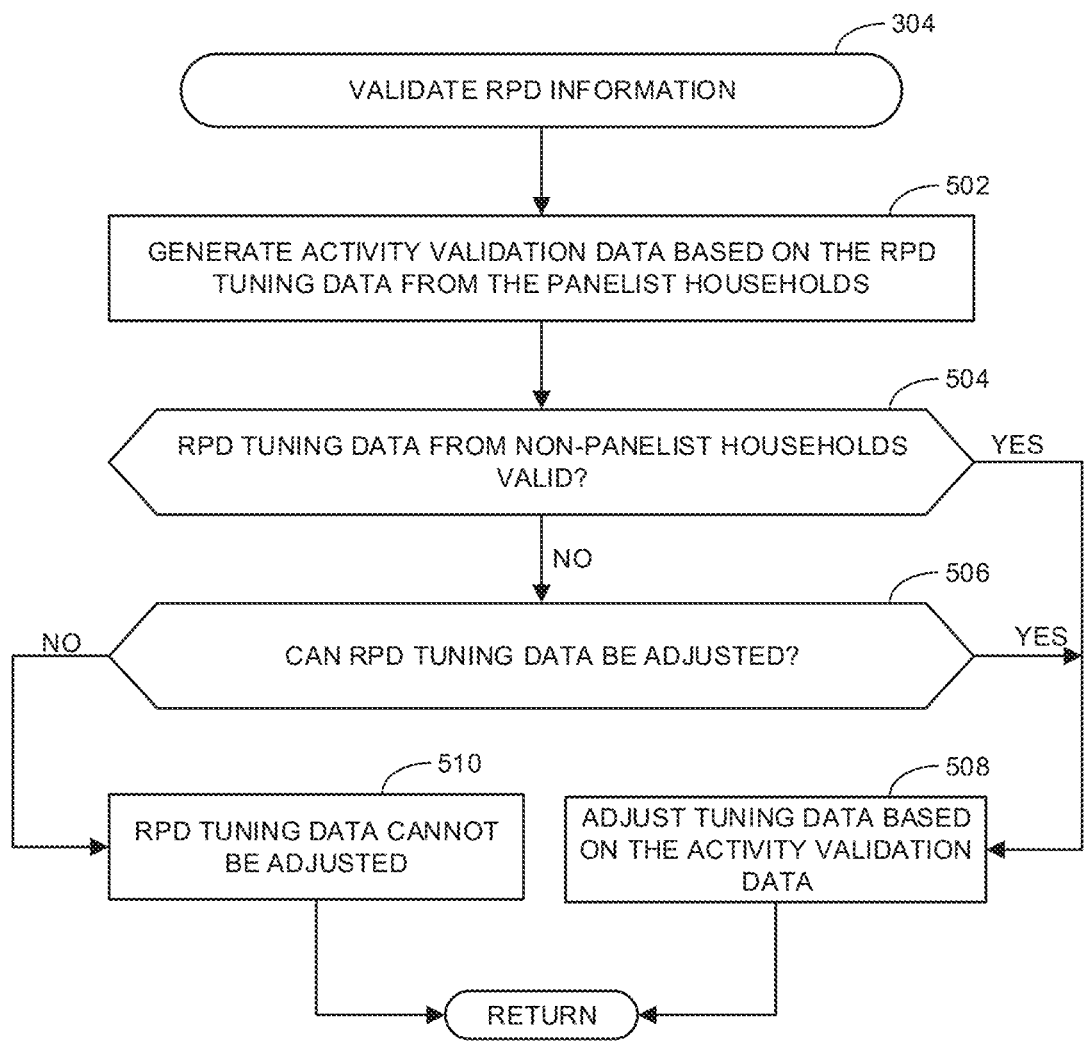

FIG. 5 is a flowchart representative of example machine readable instructions that may be executed to implement the RPD validator 206 to validate RPD information and/or to perform the processing at block 304 of FIG. 3. The process 304 of FIG. 5 begins when the RPD validator 206 generates activity validation data based on the RPD tuning data from the panelist households (block 502). The RPD validator 206 then determines if the RPD tuning data from the non-panelist households is valid (block 504). If the RPD tuning data from the non-panelist households is valid, the process proceeds to block 508 to adjust tuning data based on the activity validation data. If the RPD tuning data is not valid, the RPD validator 206 determines if the RPD tuning data can be adjusted (block 506). If the RPD tuning data cannot be adjusted, the RPD validator 206 signals that the RPD tuning data cannot be adjusted (block 510). If the RPD tuning data can be adjusted, the RPD validator 206 adjusts the tuning data based on the activity validation data (block 508). The process then returns to block 304.

Figure 6:
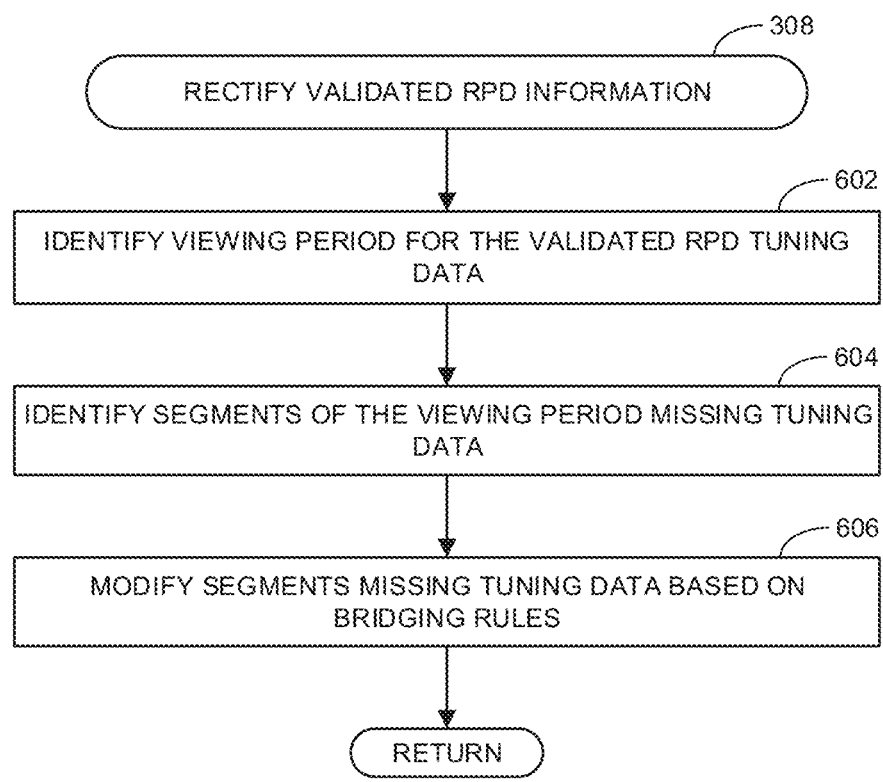

FIG. 6 is a flowchart representative of example machine readable instructions that may be executed to implement the RPD rectifier 208 to rectify RPD information and/or to perform the processing at block 308 of FIG. 3. The process 308 of FIG. 6 begins when the RPD rectifier 208 identifies viewing periods for the validated RPD tuning data (block 602). The RPD rectifier 208 then identifies segments of the viewing period missing tuning data (block 604). The RPD rectifier 208 then modifies segments missing tuning data based on bridging rules (block 606). For example, the RPD rectifier 208 modifies the segments based on the bridging rules detailed above in connection with FIG. 2. The process then ends.

Figure 7:
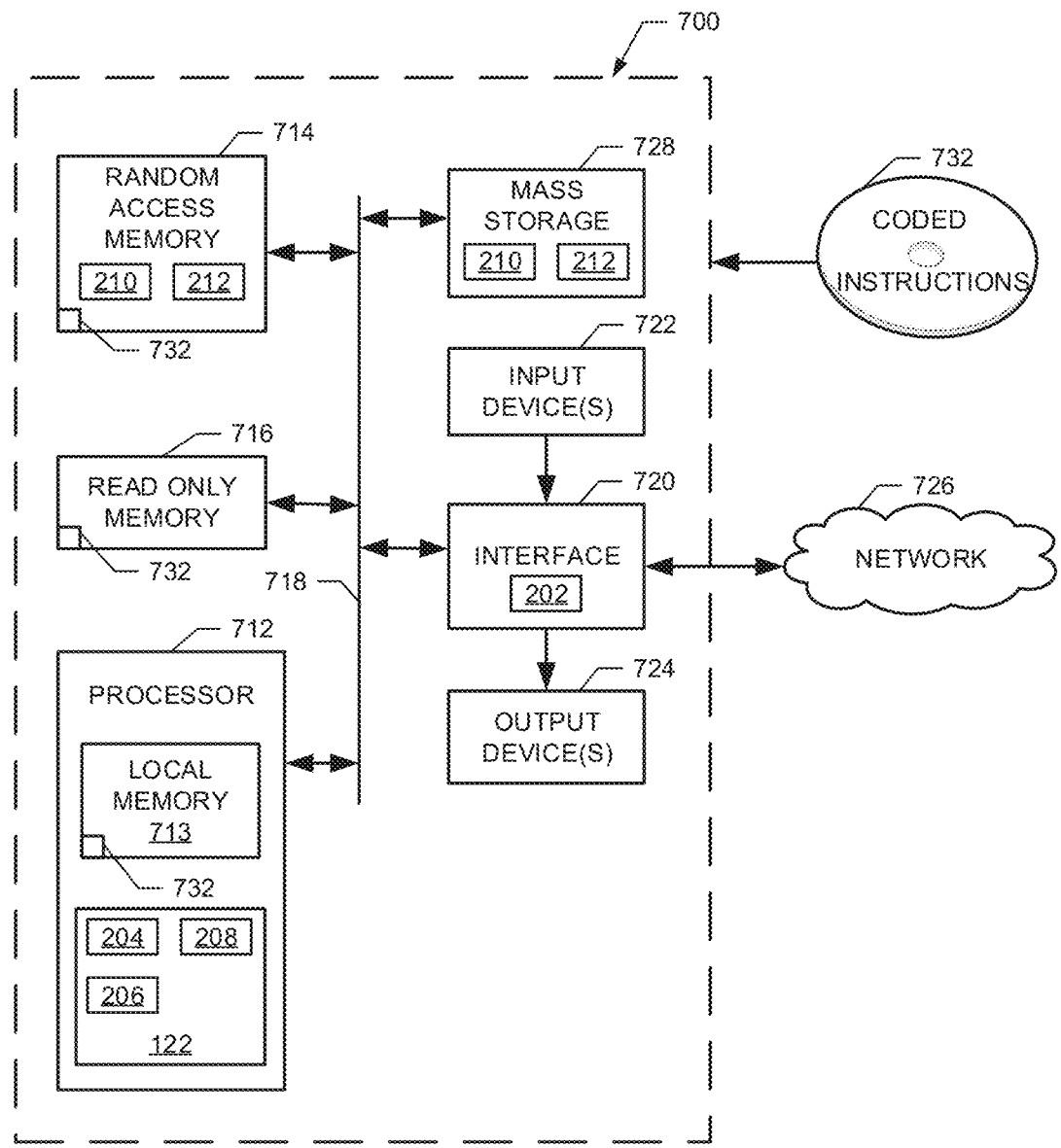
FIG. 7 is a schematic illustration of an example processing system structured to execute the example machine-readable instructions of FIGS. 4-6 to implement the example RPD calibration module of FIGS. 1 and/or 2.

FIG. 7 is a block diagram of an example processor platform 700 structured to execute the instructions of FIGS. 3-6 to implement the RPD calibration module 122 of FIG. 1. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example RPD classifier 204, the example RPD validator 206, the example RPD rectifier 208, and/or, more generally, the example RPD calibration module 122.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a trackpad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc. In the illustrated example, the interface circuit 720 implements the example communication interface 202 at the example RPD calibration module 122.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives. In some examples, the mass storage device 728 implements the example panel tuning data database 210, and/or the example RPD tuning data database 212 of the example RPD calibration module 122. Additionally or alternatively, in some examples, the memory 714 implements the example panel tuning data database 210, and/or the example RPD tuning data database 212 of the example RPD calibration module 122

The machine executable instructions 732 of FIGS. 3-6 may be stored in the mass storage device 728, in the volatile memory 714, in the non-volatile memory 716, and/or on a removable non-transitory computer readable storage medium such as a CD or DVD.

From the foregoing, it will be appreciated that example methods, apparatus and articles of manufacture have been disclosed that provide improved functionality for a processor or other computer device analyzing RPD tuning data collected from households. Such RPD tuning data is calibrated such that the RPD tuning data may improve the accuracy of corresponding results and/or improve the subsequent processing of the RPD tuning data.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
communications interface circuitry to receive, via a network, first and second return path data from a plurality of households that include set top boxes, the plurality of households associated with a geographic region having a population such that the households number in at least the thousands;
memory to store the first and second return path data;
instructions; and
processor circuitry to execute the instructions to:
classify first viewing periods, associated with respective ones of the households, into at least one of a live tuning classification or a playback tuning classification based on one or more segments of the first return path data, the first return path data corresponding to the first viewing periods; and
classify second viewing periods, associated with respective ones of the households, into a gap tuning classification based on one or more segments of the second return path data, the second return path data corresponding to the second viewing periods, the gap tuning classification to indicate the second return path data is associated with missing tuning data;

select at least one of a plurality of available methods to rectify the missing tuning data, the at least one of the plurality of available methods to be selected based on a hierarchy of different tuning classifications, the different tuning classifications including the live tuning classification and the playback tuning classification; and rectify the second return path data associated with the missing tuning data, using the at least one of the plurality of available methods, based on valid tuning data included in the first return path data, rectification of the second return path data to improve operation of a computer determining media ratings based on the second return path data by correcting for bias in the second return path data.

2. The apparatus of claim 1, wherein the processor circuitry is to replace the missing tuning data associated with the second viewing periods with the tuning data included in one or more segments of return path data associated with the first viewing periods to rectify the missing tuning data.

3. An apparatus comprising:
communications interface circuitry to receive, via a network, first and second return path data from a plurality of households that include set top boxes, the plurality of households associated with a geographic region having a population such that the households number in at least the thousands;
instructions; and
processor circuitry to execute the instructions to:
classify first viewing periods, associated with respective ones of the households, into at least one of a live tuning classification or a playback tuning classification based on one or more segments of the first return path data, the first return path data corresponding to the first viewing period;
classify second viewing periods, associated with respective ones of the households, into a gap tuning classification based on one or more segments of the second return path data, the second return path data corresponding to the second viewing periods, the gap tuning classification to indicate the second return path data is associated with missing tuning data;
determine whether a segment of tuning data covered by the first viewing periods has a start time and an end time that are consistent relative to a broadcast start time and a broadcast end time;
determine the first return path data includes valid tuning data based on the start time and the end time being consistent relative to the broadcast start time and the broadcast end time; and
rectify the second return path data associated with the missing tuning data based on the valid tuning data included in the first return path data, rectification of the second return path data to improve operation of a computer determining media ratings based on the second return path data by correcting for bias in the second return path data.

4. The apparatus of claim 3, wherein the first return path data is obtained from a non-panelist household, and the processor circuitry is to:
generate activity validation data based on third return path data obtained from a panelist household; and
when the start time and the end time of the segment of tuning data for the first return path data are not consistent, adjust the first return path data to include the valid tuning data based on the activity validation data.

5. The apparatus of claim 1, wherein a first one of the first viewing periods, associated with a first one of the households, covers multiple segments of tuning data, and the processor circuitry is to:
determine whether ones of the multiple segments of tuning data are associated with at least one tuning source;
when more than one of the multiple segments of tuning data is not associated with at least one tuning source, compare a total tuning duration of the first one of the first viewing periods to mapped tuning duration of the first one of the first viewing periods, the mapped tuning duration corresponding to a duration of the ones of the multiple segments of tuning data associated with at least one tuning source; and
determine the first return path data includes the valid tuning data based on the comparison of the total tuning duration to the mapped tuning duration.

6. A non-transitory computer readable medium comprising instructions that, when executed, cause a machine to at least:
receive, via a network, first and second return path data from a plurality of households that include set top boxes, the plurality of households associated with a geographic region having a population such that the households number in at least the thousands;
classify first viewing periods, associated with respective ones of the households, into at least one of a live tuning classification or a playback tuning classification based on one or more segments of the first return path data, the first return path data corresponding to the first viewing periods;
classify second viewing periods, associated with respective ones of the households, into a gap tuning classification based on one or more segments of the second return path data, the second return path data corresponding to the second viewing periods, the gap tuning classification to indicate the second return path data is associated with missing tuning data;
select at least one of a plurality of available methods to rectify the missing tuning data, the at least one of the plurality of available methods to be selected based on a hierarchy of different tuning classifications, the different tuning classifications including the live tuning classification and the playback tuning classification; and
rectify the second return path data associated with the missing tuning data, using the at least one of the plurality of available methods, based on valid tuning data included in the first return path data, rectification of the second return path data to improve operation of a computer determining media ratings based on the second return path data by correcting for bias in the second return path data.

7. The non-transitory computer readable medium of claim 6, wherein the instructions cause the machine to replace the missing tuning data associated with the second viewing periods with the tuning data included in one or more segments of return path data associated with the first viewing periods to rectify the missing tuning data.

8. A non-transitory computer readable medium comprising instructions that, when executed, cause a machine to at least:

receive, via a network, first and second return path data from a plurality of households that include set top boxes, the plurality of households associated with a geographic region having a population such that the households number in at least the thousands;

classify first viewing periods, associated with respective ones of the households, into at least one of a live tuning classification or a playback tuning classification based on one or more segments of the first return path data, the first return path data corresponding to the first viewing period;

classify second viewing periods, associated with respective ones of the households, into a gap tuning classification based on one or more segments of the second return path data, the second return path data corresponding to the second viewing periods, the gap tuning classification to indicate the second return path data is associated with missing tuning data;

determine whether a segment of tuning data covered by the first viewing periods has a start time and an end time that are consistent relative to a broadcast start time and a broadcast end time;

determine the first return path data includes valid tuning data based on the start time and the end time being consistent relative to the broadcast start time and the broadcast end time; and rectify the second return path data associated with the missing tuning data based on the valid tuning data included in the first return path data, rectification of the second return path data to improve operation of a computer determining media ratings based on the second return path data by correcting for bias in the second return path data.

9. The non-transitory computer readable medium of claim 8, wherein the first return path data is obtained from a non-panelist household, and the instructions cause the machine to:

generate activity validation data based on third return path data obtained from a panelist household; and when the start time and the end time of the segment of tuning data for the first return path data are not consistent, adjust the first return path data to include the valid tuning data based on the activity validation data.

10. The non-transitory computer readable medium of claim 6, wherein a first one of the first viewing periods, associated with a first one of the households, covers multiple segments of tuning data, and the instructions further cause the machine to:

determine whether ones of the multiple segments of tuning data are associated with at least one tuning source;

when more than one of the multiple segments of tuning data is not associated with at least one tuning source, compare a total tuning duration of the first one of the first viewing periods to mapped tuning duration of the first one of the first viewing periods, the mapped tuning duration corresponding to a duration of the ones of the multiple segments of tuning data associated with at least one tuning source; and determine the first return path data includes the valid tuning data based on the comparison of the total tuning duration to the mapped tuning duration.

11. An apparatus comprising:

communications interface circuitry to receive, via a network, return path data from a plurality of households that include set top boxes, the plurality of households associated with a geographic region having a population such that the households number in at least the thousands;

memory to store the return path data;

instructions; and processor circuitry to execute the instructions to:
classify viewing periods, associated with respective ones of the households, the viewing periods associated with one or more segments of the return path data into two or more tuning classifications based on the one or more segments of the return path data;

calculate a total reported tuning duration for a first viewing period of the viewing periods based on individual tuning durations for the first viewing period associated with respective ones of the two or more tuning classifications;

compare the total reported tuning duration to a duration threshold; and either retain or discard the return path data associated with the first view period based on the comparison to improve operation of a computer determining media ratings by correcting for bias in the return path data.

12. The apparatus of claim 11, wherein the two or more tuning classifications includes at least one of live tuning or playback tuning.

13. The apparatus of claim 11, wherein the processor circuitry is to:

determine whether the return path data is associated with an error based on the comparison;

retain the return path data when the return path data is not associated with the error; and discard the return path data when the return path data is associated with the error.

14. The apparatus of claim 11, wherein the duration threshold is greater than a duration of the first viewing period.

15. The apparatus of claim 11, wherein the processor circuitry is to determine a number of tuning sources tuned by the set top boxes during the viewing periods based on the one or more segments of return path data associated with the viewing periods.

16. The apparatus of claim 15, wherein the processor circuitry is to determine the number of tuning sources based on tuning sources tuned by the set top boxes for at least a threshold portion of ones of the viewing periods.

17. The apparatus of claim 15, wherein the processor circuitry is to classify the viewing periods as a conflicted tuning period when the number of tuning sources satisfies a tuning source threshold.

18. The apparatus of claim 17, wherein the processor circuitry is to:

classify multiple viewing periods associated with different segments of the return path data from a first one of the set top boxes into the tuning classifications, the multiple viewing periods including the first viewing period; and determine whether the return path data is useable based on a comparison of a proportion of the multiple viewing periods classified as conflicted tuning periods to a conflicted tuning threshold.

19. The apparatus of claim 1, wherein the hierarchy of different tuning classifications defines a preference of the live tuning classification over the playback tuning classification.

20. The apparatus of claim 1, wherein the hierarchy of different tuning classifications defines a preference of the playback tuning classification over a stand-by classification.

\* \* \* \* \*